United States Patent [19]
Harris et al.

[11] Patent Number: 5,643,505
[45] Date of Patent: Jul. 1, 1997

[54] METHOD FOR MAKING LOW COST INFRARED WINDOWS

[75] Inventors: Norman H. Harris, Newhall; Thomas K. Dougherty, Playa Del Rey, both of Calif.

[73] Assignee: Hughes Aircraft Company, Los Angeles, Calif.

[21] Appl. No.: 511,670

[22] Filed: Aug. 7, 1995

Related U.S. Application Data

[62] Division of Ser. No. 232,897, Apr. 22, 1994, Pat. No. 5,575,959.
[51] Int. Cl.[6] .............................. B29D 11/00; B05B 5/00; B05D 5/06
[52] U.S. Cl. .................. 264/1.21; 423/566.1; 427/160; 427/162; 264/102
[58] Field of Search ............................ 264/1.21, 125, 264/102; 423/566.1; 427/160, 162

[56] References Cited

U.S. PATENT DOCUMENTS

| | | | |
|---|---|---|---|
| 3,131,025 | 4/1964 | Carnall, Jr. et al. | 264/1.21 |
| 3,131,238 | 4/1964 | Carnall, Jr. et al. | 264/1.21 |
| 4,944,900 | 7/1990 | Willingham et al. | 264/1.21 |
| 5,126,081 | 6/1992 | Willingham et al. | 264/1.21 |

*Primary Examiner*—Christopher A. Fiorilla
*Attorney, Agent, or Firm*—M. E. Lachman; M. W. Sales; W. K. Denson-Low

[57] ABSTRACT

Low cost broadband infrared windows are fabricated using a near net shape process which greatly reduces the cost of machining and grinding window materials. The fabrication of zinc sulfide (ZnS) IR windows uses ceramic powder processing to avoid the expensive prior art chemical vapor deposition method. Further, the invention involves a means of hardening and strengthening ZnS as part of the powder process, with IR transmission performance comparable to undoped CVD-prepared ZnS. The compositional modification used in the practice of the invention involves the introduction of gallium sulfide ($Ga_2S_3$) as a second phase which acts to toughen and harden the ZnS. The process of the present invention achieves a hardening effect without degrading the IR transmission properties also by means of controlling the polycrystalline microstructure grains to a very small size. At the same time, porosity, which strongly degrades IR transmission, is minimized by full densification. The gallium is introduced into the ZnS by a coprecipitation process to both lower the raw material cost and obtain a suitable submicrometer precursor for the subsequent ceramic processing. The Ga-doped ZnS is then densified into an IR window and a second phase, zinc thiogallate ($ZnGa_2S_4$), is precipitated out as a hardening phase by heat treatment. Alternatively, Ga metal is evaporated onto densified ZnS and subjected to heat treatment to form the zinc thiogallate phase.

11 Claims, 2 Drawing Sheets

METHOD FOR MAKING LOW COST INFRARED WINDOWS

This is a division of application Ser. No. 08/232,897 filed Apr. 22, 1994, now U.S. Pat. No. 5,575,959.

BACKGROUND OF THE INVENTION

1. Field of the Invention

The present invention relates generally to broadband infrared windows, and, more particularly, to a low cost process for manufacturing such windows.

2. Description of Related Art

Recent efforts have been undertaken to develop a vision enhancement system for automotive and other high volume applications. Such systems employ infrared (IR) detectors and are used, for example, to provide an early warning of close proximity to other vehicles.

Infrared emitter and detector assemblies commonly employ a window which protects the infrared components while permitting the transmission of infrared radiation. Commonly, II–VI materials, such as zinc sulfide (ZnS), zinc selenide (ZnSe), and cadmium telluride (CdTe), have been employed as infrared window materials.

ZnS windows were produced by hot pressing of ceramic powders years ago by Kodak and others; see, e.g., U.S. Pat. No. 3,131,238, issued Apr. 28, 1964. The development of a chemical vapor deposition (CVD) process for fabricating ZnS largely replaced the prior method of making ZnS for military applications where cost was not an important consideration. The CVD Zns could be fabricated in larger, flat or curved pieces to conform to aircraft shape requirements. However, there was no improvement in mechanical properties with the CVD process. In fact, when CVD ZnS was annealed, it became more transmissive in the optically visible region, but the ZnS also became much softer. It is believed that the removal of the high temperature (hexagonal) wurtzite phase by the heat treatment is responsible for the increase in IR transmission and that the growth of large grains caused the material to soften. For a discussion of ZnS formation by hot pressing and by CVD, see J. A. Savage, *Infrared Optical Materials and Their Antireflection Coatings*, Adam Hilger LTD., Bristol and Boston (1985), pp. 95–111.

The CVD process is very slow and not easily amenable to high volume production, and typically requires a week to make a CVD run. The as-formed CVD ZnS has a yellow color due to the presence of absorbing defects. But most important is the intrinsic high cost of CVD fabrication which makes IR windows produced by this method prohibitively expensive for high volume markets.

The use of gallium sulfide for hardening zinc sulfide was investigated by J. Zhang et al, "Solid-State Phase Equilibria in the ZnS-$Ga_2S_3$ System", *Journal of the American Ceramic Society*, Vol. 73, No. [6], pp. 1544–1547 (1990). It was found that ZnS-$Ga_2S_3$ solid solution yielded more than a 50% increase in hardness and fracture toughness. A model was developed that correlated porosity and second phase material ($ZnGa_2S_4$, zinc thiogallate) with transmission in the infrared region. The model predicted that when porosity approached zero volume percent and precipate sizes were smaller than one micrometer, the transmission properties of zinc sulfide would not be altered.

The work of Zhang et al was limited to the addition of gallium sulfide in the bulk zinc sulfide material. They published additional work on the phase equilibria of the gallium and zinc sulfide binary system to establish a means for forming zinc thiogallate as a second phase. The solid solution region for gallium in zinc sulfide was found to decrease with lower temperatures below the cubic to hexagonal phase transformation temperature at 1,025° C. Thus, at a lower temperature, the gallium would be expected to precipitate out as a second phase, zinc thiogallate ($ZnGa_2S_4$) as described by W. W. Chen et al, "Experimental and Theoretical Studies of Second-Phase Scattering in IR Transmitting ZnS-Based Windows", *Proceedings of SPIE*, San Diego (1991).

A low cost IR window is a mandatory requirement in order to be able to market an affordable vision enhancement system for automotive and other high volume applications. The cost of the IR window is a major factor in the viability of offering an IR device for general use. The potential safety benefits to the driving public are enormous. Many lives could be saved and needless destruction of automobiles could be prevented if such a device were available at a reasonable cost.

Accordingly, a need exists for the production of a low cost IR window.

SUMMARY OF THE INVENTION

In accordance with the invention, a method is provided for the fabrication low cost broadband infrared windows. The window fabrication method involves a near net shape process which greatly reduces the cost of machining and grinding window materials. The fabrication of zinc sulfide (ZnS) IR windows uses ceramic powder processing to avoid the expensive CVD method. Further, the invention involves a means of hardening and strengthening ZnS as part of the powder process, with IR transmission performance comparable to undoped CVD-prepared ZnS.

The compositional modification used in the practice of the invention involves the introduction of gallium sulfide ($Ga_2S_3$) as a second phase which acts to toughen and harden the ZnS. The invention achieves a hardening effect without degrading the IR transmission properties also by means of controlling the precipitates to a very small size. At the same time, porosity, which strongly degrades IR transmission, is minimized by full densification. In one embodiment, the gallium is introduced into the ZnS by a coprecipitation process to both lower the raw material cost and obtain a suitable submicrometer precursor for the subsequent ceramic processing. The Ga-doped ZnS is then densified into an IR window and a second phase, zinc thiogallate ($ZnGa_2S_4$), is precipitated out as a hardening phase by annealing. Alternatively, gallium metal is deposited on the densified ZnS prior to annealing. The annealing process then forms the zinc thiogallate phase.

The process of the present invention comprises:
(a) either
 (1) forming a coprecipitate of a sulfide, a zinc salt, and a gallium dopant in a liquid medium,
 (2) pressing the coprecipitate in a die, and
 (3) densifying the pressed coprecipitate by hot isostatic pressing to form a densified body;
(b) or
 (1) forming a coprecipitate of a sulfide and a zinc salt in a liquid medium,
 (2) pressing the coprecipitate in a die,
 (3) densifying the pressed coprecipitate by hot isostatic pressing to form a densified body, and
 (4) depositing a layer of gallium metal on at least one surface of the densified body; and (c) annealing the densified body.

Either in the coprecipitation step or following densification, the gallium dopant is introduced into the material. If introduced in the coprecipitation step, a gallium salt is combined with the sulfide and zinc salt. If introduced after densification, evaporation of gallium metal onto the surface of the densified ZnS is performed, followed by annealing to diffuse it to a depth dependent on the time and temperature of annealing.

The principal benefits of the present invention are the attainment of a low cost IR window with improved strength while maintaining the same IR transmission property. The lower cost is achieved mainly through the use of ceramic powder processing with higher potential production volume, shorter cycle time processing steps, by eliminating the need for expensive CVD processing, by forming to near net shape to eliminate machining, and by reducing the need for a hard coating to protect the relatively soft and weak ZnS IR window material.

DESCRIPTION OF THE PREFERRED EMBODIMENTS

Figure 1:
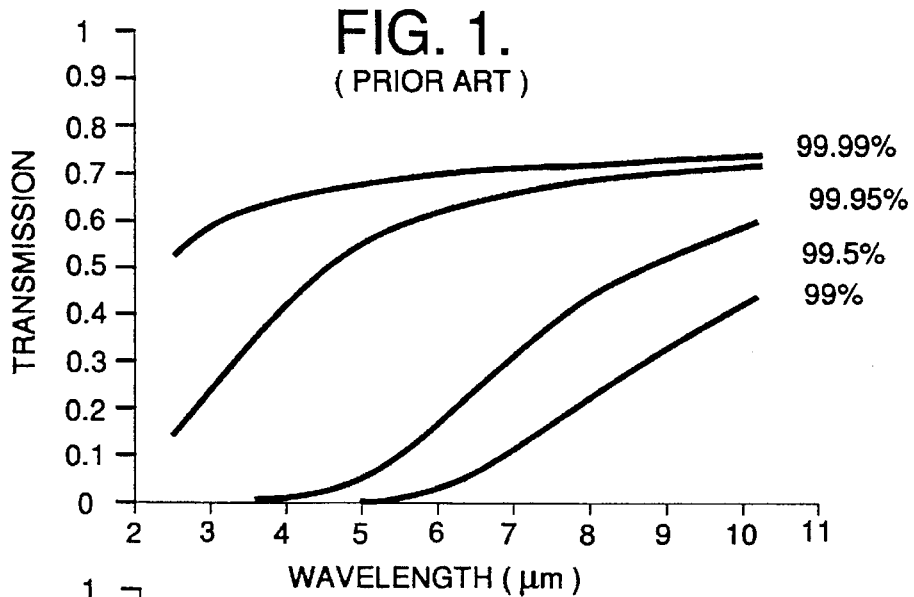
FIG. 1, on coordinates of transmission and wavelength (in micrometers), is a plot of the transmission curves of a hypothetical 2 mm thick ZnS parallel slab containing 0.3 micrometer pores as a function of volume fraction porosity.

The model developed by Chen and Dunn, supra, for correlating porosity with transmission in the infrared region is depicted in FIG. 1. This model predicts that with porosity approaching zero and with $ZnGa_2S_4$ precipitates smaller than 1 micrometer, the addition of gallium sulfide would not degrade the transmission properties as depicted in FIGS. 2 and 3.

Specifically, in FIG. 1, the importance of eliminating residual porosity is illustrated in the plot of transmission vs. IR wavelength. The transmission curves are all calculated for hypothetical ZnS window with theoretical densities ranging from 99.00 to 99.99%.

Figure 2:
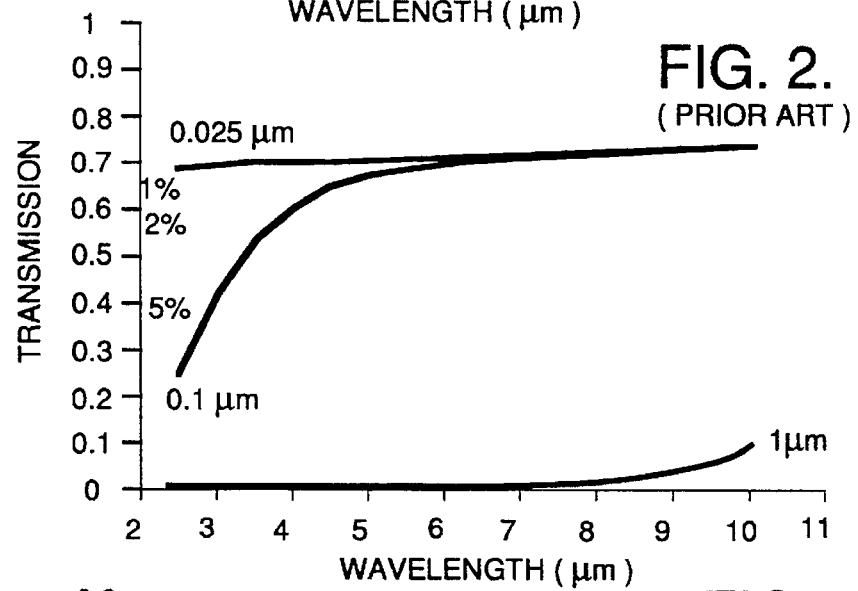
FIG. 2, on coordinates of transmission and wavelength (in micrometers), is a plot of the transmission curves of a hypothetical 2 mm thick ZnS parallel slab containing a fixed 5 mole percent as a function of size of $ZnGa_2S_4$ particles.

FIG. 2 illustrates the effect of pore size on transmission. A pore size of 1 µm causes so much scattering that nearly all IR transmission below 8 µm in wavelength is eliminated. However, when the pore size is as small as 0.025 µm, the transmission is nearly at the theoretical level of 70 to 75%.

Figure 3:
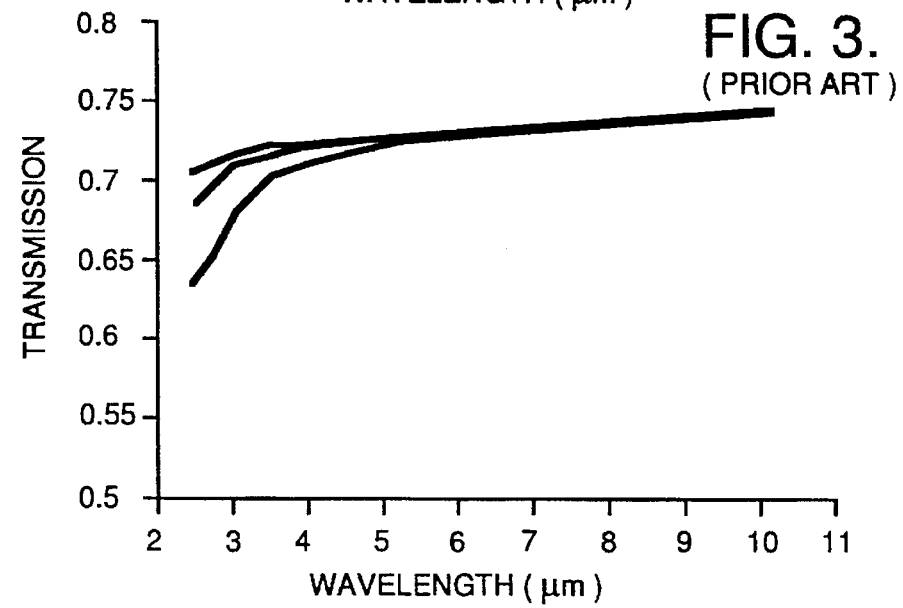
FIG. 3, on coordinates of transmission and wavelength (in micrometers), is a plot of the transmission curves of a hypothetical 2 mm thick ZnS parallel slab containing approximately 500 Å (50 nm) radius $ZnGa_2S_4$ particles as a function of mole percent.

FIG. 3 shows the IR transmission vs. wavelength for 1, 2, and 5 mole percent theoretical additions of zinc thiogallate. While this plot is a calculated curve, it shows that the IR transmission can still be maintained even with the presence of a zinc thiogallate second phase.

In the process of the present invention, gallium is added for hardening zinc sulfide by coprecipitation of the gallium as an integral part of the zinc sulfide crystal lattice which forms an intimate mixture of zinc sulfide and gallium sulfide. The (Zn,Ga)S solid solution can then be mixed with the pure ZnS as a bulk component, a surface enrichment component, or as part of a gradient of concentrations.

The prior art CVD process for making IR windows and ZnS windows in particular is expensive, costing $40 to $80 per window (1993 dollars), is slow, and results in low volume production. In contrast, the process of the invention is comparatively cheap, costing $15 to $25 per window, is fast, and results in high volume production. In addition, the capital cost of equipment to scale-up to high volume production is much less with the process of the present invention compared with that for the CVD process.

The prior art CVD process begins with molten Zn and gaseous hydrogen sulfide ($H_2S$). These reactants are used to form a ZnS window in a rather slow deposition process, taking about 1 week. The resulting CVD ZnS is then annealed, machined to size, and ground and polished. A hard coating is then applied to the windows, followed by application of an anti-reflective coating. The chemical vapor deposition is the rate limiting step in the process.

The near net shape (powder) process in the present invention involves first a coprecipitation to form a very small particle sized grain of ZnS (less than 0.2 µm). The reactants used in the preferred embodiment of the invention are sodium sulfide and zinc acetate in an aqueous solution. However, other sulfides, such as ammonium sulfide, lithium sulfide, potassium sulfide, and hydrogen sulfide, and other zinc salts, such as zinc nitrate, zinc chloride, and zinc sulfate, may be employed in the practice of the present invention.

By controlling the pH, concentration, temperature, product removal rate, and mixing conditions, the particle size distribution can be controlled. The process of the present invention avoids the need for $H_2S$ injection into the reactor vessel. However, $H_2S$ is produced as a by-product which is collected and neutralized using a dilute sodium hydroxide solution. The chemical reaction can be written as follows:

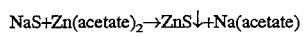

then,

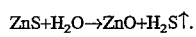

The concentration of the sulfide and zinc salt each ranges from about 0.02 to 0.5 Molar. A tradeoff ensues: the lower concentrations promote smaller grain sizes of the coprecipitate, while the higher concentrations promote higher yields. This is due to mechanical losses caused by manipulation of large quantities of aqueous solutions. The optimum concentration that balances these considerations is about 0.4 Molar. For stoichiometric reaction, the sulfide and zinc salt are preferably employed in the same concentrations, so as to provide a ratio of 1:1 of atomic sulfur to atomic zinc.

The coprecipitation process lends itself to the introduction of a dopant, gallium (Ga). Ga has been shown to significantly improve the ZnS mechanical properties of fracture toughness and the hardness by as much as 50 percent.

Gallium is introduced by adding about 1 to 9 mole percent of a gallium salt, such as a nitrate, acetate, chloride, or sulfate of gallium, in the mixture of the sulfide and zinc salt. The gallium additive mixes with the zinc salt in the appropriate ratio. The resulting precipitate is concentrated with a centrifuge and cleansed of the sodium acetate by-product by alternate water washings and centrifuging operations.

The subsequent steps in the process include pressing in a die to the desired shape, with an allowance for the expected shrinkage during sintering if pressed cold. Hot pressing does not result in any significant shrinkage so its die can be the net shape and size of the desired window configuration.

Hot pressing is performed at a temperature ranging from about 500° to 980° C. at a pressure ranging from about 2,000 to 25,000 psi (140.6 to 1,757.5 $Kg/cm^2$) for a time ranging from about 5 to 240 minutes. The hot pressing is performed in a vacuum, such as pulled by a mechanical pump, which is on the order of 50 milliTorr or below.

At a temperature less than about 500° C., the material is not as plastic, and does not form a fully dense material. At the upper temperature end, there is a phase transition at about 1,020° C. from cubic to hexagonal that must be avoided.

A pressure less than about 2,000 psi (140.6 $Kg/cm^2$) results in a compact that has open pores and is less dense, while a pressure greater than about 25,000 psi (1,757.5 $Kg/cm^2$) requires expensive dies and is not necessary in the practice of the process of the present invention.

In an alternative process to hot pressing, the coprecipitated powders may be cold pressed and then vacuum sintered. Cold pressing is performed at a temperature ranging from room temperature to about 300° C. at a pressure ranging from about 5,000 to 40,000 psi (351.5 to 1,212 $Kg/cm^2$) for about 2 minutes. It is preferred that moisture be excluded from the powder after drying and during pressing. Vacuum sintering is performed at a temperature ranging from about 600° to 850° C. for a period of time ranging from about 10 minutes to 2 hours.

An additional feature of the invention is the use of polished die platens so that the finish is replicated to greatly minimize grinding and polishing. The die platens are polished using a hard material down to 0.5 µm size. By forming to net shape and size, the initial machining required for CVD processing is eliminated.

The porosity is removed by densifying to full theoretical density by hot isostatic pressing (HIP) at a temperature ranging from about 800° to 1,015° C. at a pressure ranging from about 5,000 to 60,000 psi (351.5 to 4,218 $Kg/cm^2$) for a period of time ranging from about 5 to 360 minutes in an inert atmosphere, such as argon or nitrogen.

The desired zinc thiogallate phase is then achieved by subsequent annealing. The annealing can be accomplished during the hot isostatic pressing or, in the interest of maximizing the production utilization of this equipment, the annealing can be accomplished in a separate atmosphere controlled furnace. The annealing is performed at a temperature ranging from about 550° to 850° C. for a period of time from about 1 to 4 hours. Oxidation of the zinc sulfide windows is prevented by the use of an inert or reducing atmosphere; argon is an example of a suitable atmosphere.

The grain size can be kept small by using lower pressing temperatures and shorter soak times. The tradeoff is the minimum temperature and time required to achieve fully dense ZnS with acceptable IR transmission.

In an alternate embodiment, the gallium dopant is not combined in the coprecipitation step. Rather, only the sulfide and zinc salt are coprecipitated, and the precipitate hot pressed and then hot isostatic pressed. Following this densification, gallium metal is evaporated on the surface of the ZnS body, followed by annealing under the conditions described above to diffuse the gallium metal to a depth dependent on the time and temperature, thereby forming a surface zinc thiogallate phase.

The overall process of the invention is thus seen to be considerably shorter than the prior art CVD process.

Figure 4:
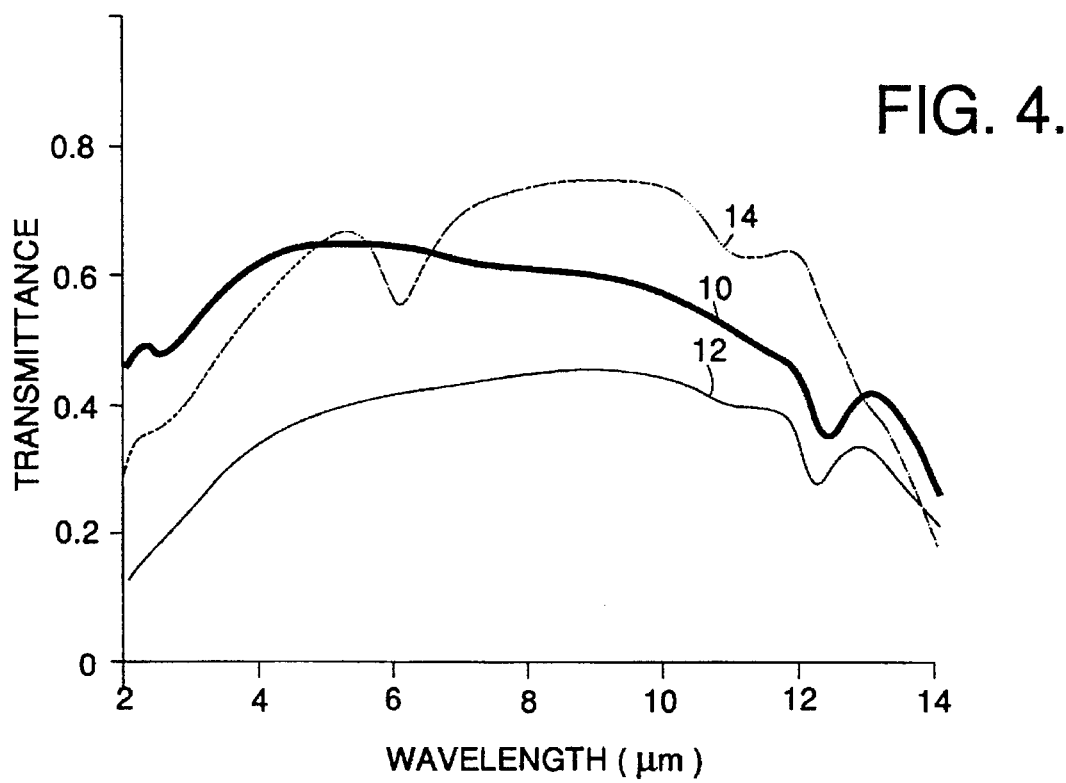
FIG. 4, on coordinates of transmission and wavelength (in micrometers), is a plot of infrared transmittance of ZnS over a wavelength of 2 to 14 µm after hot pressing and then after hot isostatic pressing in accordance with the invention compared with ZnS formed by a prior art chemical vapor deposition process.

The resulting improvements in IR transmission from the invention after the HIP removes the porosity remaining from hot pressing are shown in FIG. 4. Curves 10 and 12 depict the result of IR windows with no anti-reflection (A-R) coating employing portions of the process of the invention. Curve 10 compares the transmittance of an IR window following the HIP cycle with the transmittance of an IR window after hot pressing only (Curve 12), both measured on the same sample. The transmittance of a CVD-processed IR window is included for comparison (Curve 14). The goal was 60% transmittance without the A-R coating. The HIP cycle incorporated an annealing step as part of the cycle. The anneal involved holding the sample at 550° C. for two hours during the cooldown of the HIP furnace.

Figure 5:
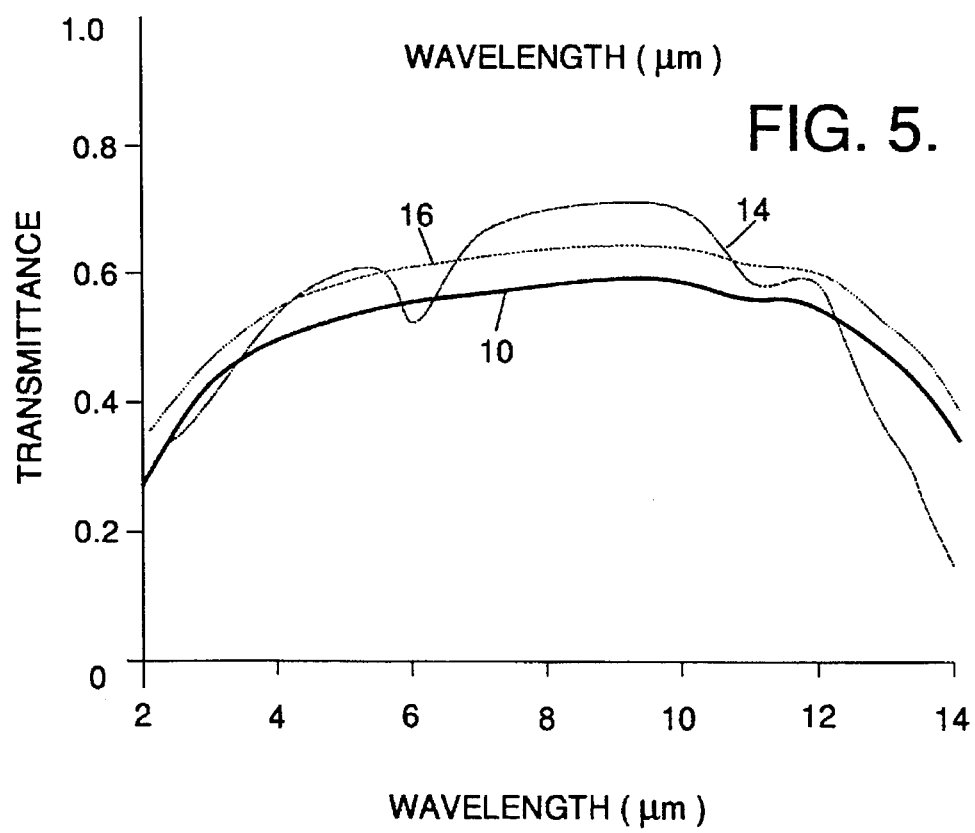
FIG. 5, on coordinates of transmission and wavelength (in micrometers), is a plot of infrared transmittance of ZnS over a wavelength of 2 to 14 µm after hot isostatic pressing and gallium surface toughening in accordance with the invention compared with ZnS formed by a prior art chemical vapor deposition process.

The effect of surface hardening with Ga-doping in the present invention is to actually increase the IR transmission. It is not clear whether a slight reduction in the index of refraction is responsible for this improvement, shown in FIG. 5. Curve 16 demonstrates the improvement with the zinc thiogallate second phase, generated by annealing.

Specifically, the lower curve (Curve 18) was derived from commercially prepared ZnS powder, available from Aldrich Co., that was hot pressed, hot isostatic pressed, and then polished. The next higher transmitting curve (Curve 16) was the resulting transmission after the same sample used to generate Curve 18 was subjected to evaporation of Ga metal, followed annealing in a fused quartz tube to cause the Ga to diffuse into the ZnS and form zinc thiogallate. The annealing was done at a temperature of 650° C. in an inert (argon) atmosphere. The fact that the IR transmission was improved by about 10% over the entire spectrum may have been due to the formation of a layer having a lower index of refraction. However, most importantly, the IR transmission at least was not degraded by the hardening process.

The improvements in hardness are shown in Table I for bulk toughening with gallium thiogallate.

TABLE I

| Microindentation Hardness Measurements for ZnS. | | |
| --- | --- | --- |
| Material | Process | Hardness (GPa) |
| II–VI – undoped | CVD – baseline | 1.95 ± 0.03 |
| Untreated | Hot pressed | 1.92 ± 0.03 |
| Untreated | HIP'd | 2.44 ± 0.02 |
| 1% bulk doping | HIP'd | 2.54 ± 0.05 |
| 9% bulk doping | HIP'd | 3.08 ± 0.24 |

The experimental work has reduced the present invention to practice by demonstrating the process. Measurable improvements have been observed in IR transmission and hardness as a result of using the preferred embodiment of this invention.

In the present invention, gallium was added either as a surface diffusing ion or as a surface coating. Scanning electron microscopy (SEM) was used to analyze the microstructure of surface doped ZnS. The extent of diffusion by gallium into the ZnS as determined by electron dispersive x-ray (EDAX) ion map overlay of the same region was found to be to a depth approximately 40 micrometers. An alternative lower cost method for introducing gallium in the present invention is that of the coprecipitation of gallium as an integral part of the zinc sulfide crystal lattice which forms an intimate mixture of zinc sulfide and gallium sulfide. The zinc and gallium sulfides can then be mixed with the pure ZnS as a bulk component or as a surface enrichment component.

EXAMPLES

Example 1

0.7 mol (153 g) of zinc acetate (zinc acetate dihydrate, Spectrum Z1045), 0.028 mol (10.2 g) of gallium nitrate (gallium nitrate hexahydrate, Johnson Mathey 11150) in 1 liter of degassed $H_2O$ were combined with 0.728 (175 g) of sodium sulfide (sodium sulfide nonahydrate, Spectrum S1465) in 1 liter of degassed $H_2O$ and then added to 2.5 liters of degassed $H_2O$ with mechanical stirring. The addition period lasted one hour. Care was taken to always have an excess of the basic solution (sulfide) in the precipitation medium. The powder was isolated by concentration of the slurry in two 1 liter buckets on the centrifuge (about 15 minutes at 3,000 rpm). The concentrated powders were washed 5 times with degassed $H_2O$ by successive shaking and centrifuging.

Hot pressing was performed in the range of 800° to 950° C. with dwell times of 30 to 180 minutes. The hot isostatic pressing conditions employed were 825° to 995° C. with pressures of 25,000 to 30,000 psi (1,757.5 to 2,109 $Kg/cm^2$) and dwell times of 20 to 120 minutes. Due to agglomeration problems, near theoretical density was not achieved. However, the hardness values typically obtained are shown in Table I.

Example 2

1.46 mol (320 g) of zinc acetate (zinc acetate dihydrate, Spectrum Z1045) in 1.5 liter of degassed $H_2O$ and 1.5 mol (360 g) of sodium sulfide (sodium sulfide nonahydrate, Spectrum S1465) in 1.5 liter of degassed $H_2O$ were both stirred into 2 liters of $H_2O$. The remaining precipitation and densification steps were performed as in Example 1. The hardness values typically obtained are shown in Table I.

Thus, there has been disclosed a method of making infrared windows. It will be readily apparent to those skilled in this art that various modifications and changes of an obvious nature may be made without departing from the scope of the invention, and all such modifications and changes are considered to fall within the scope of the invention, as defined by the appended claims.

What is claimed is:

1. A process for making an infrared window comprising the steps of:

(1) mixing a sulfide and a zinc salt in a liquid medium, and forming a coprecipitate comprising zinc sulfide.
 (2) pressing the coprecipitate in a die,
 (3) densifying the pressed coprecipitate by hot isostatic pressing to form a densified body,
 (4) depositing a layer of gallium metal on at least one surface of the densified body, and
 (5) following step (4), annealing the densified body having the layer of gallium metal deposited thereon.

2. The process of claim 1 wherein said coprecipitate is formed by mixing said sulfide and said zinc salt in an aqueous medium.

3. The process of claim 2 wherein said sulfide is selected from the group consisting of sodium sulfide, ammonium sulfide, lithium sulfide, potassium sulfide, and hydrogen sulfide and said zinc salt is selected from the group consisting of zinc acetate, zinc nitrate, zinc chloride, and zinc sulfate.

4. The process of claim 3 wherein said sulfide consists essentially of sodium sulfide and said zinc salt consists essentially of zinc acetate.

5. The process of claim 2 wherein the amount of each of said sulfide and zinc salt ranges from about 0.02 to 0.5 Molar, the ratio of sulfide to zinc salt being approximately 1:1 of atomic sulfur to atomic zinc.

6. The process of claim 5 wherein said amount of each of said sulfide and zinc salt is about 0.4 Molar.

7. The process of claim 1 wherein said coprecipitate is prepared for pressing by centrifuging to remove substantially all said liquid medium.

8. The process of claim 1 wherein said pressing is either performed at a temperature ranging from about 500° to 980° C. at a pressure ranging from about 2,000 to 25,000 psi (140.6 to 1,757.5 $Kg/cm^2$) for a period of time ranging from about 5 to 240 minutes in a vacuum of about 50 mTorr or less or performed at a temperature ranging from room temperature to about 300° C. at a pressure ranging from about 5,000 to 40,000 psi (351.5 to 2,812 $Kg/cm^2$) for a period of time of about 2 minutes, followed by vacuum sintering of said coprecipitate at a temperature ranging from about 600° to 850° C. for a period of time ranging from about 10 minutes to 2 hours.

9. The process of claim 1 wherein said hot isostatic pressing is performed at a temperature ranging from about 800° to 1,015° C. at a pressure ranging from about 5,000 to 60,000 psi (351.5 to 4,218 $Kg/cm^2$) for a period of time ranging from about 5 to 360 minutes in an inert atmosphere.

10. The process of claim 1 wherein said annealing is performed at a temperature ranging from about 550° to 850° C. for a period of time ranging from about 1 to 4 hours in an inert or reducing atmosphere.

11. A process for making an infrared window comprising the steps of (a) forming a coprecipitate of sodium sulfide and zinc acetate in an aqueous medium;
 (b) pressing the coprecipitate in a die at a temperature ranging from about 500° to 980° C. at a pressure ranging from about 5,000 to 25,000 psi (351.5 to 1,757.5 $Kg/cm^2$) for a period of time ranging from about 5 to 240 minutes in a vacuum of about 50 mTorr or less;
 (c) densifying the pressed coprecipitate by hot isostatic pressing performed at a temperature ranging from about 800° to 1,015° C. at a pressure ranging from about 5,000 to 60,000 psi (351.5 to 4,218 $Kg/cm^2$) for a period of time ranging from about 5 to 360 minutes in argon to form a densified body;
 (d) evaporating a layer of gallium metal on at least one surface of the densified body; and
 (e) following step (d), annealing the densified coprecipitate at a temperature ranging from about 550° to 850° C. for a period of time ranging from about 1 to 4 hours in an inert or reducing atmosphere.

* * * * *